United States Patent

Turpin et al.

[11] Patent Number: 5,309,540
[45] Date of Patent: May 3, 1994

[54] OPTICAL FIBER SENSOR AND A MANUFACTURING PROCESS FOR MAKING SAME

[75] Inventors: Marc Turpin, Bures sur Yvette; Marie-Noëlle Charasse, Orsay; Jean-Pierre Le Pesant, Gif sur Yvette, all of France

[73] Assignee: Thomson-CSF, Puteaux, France

[21] Appl. No.: 966,403

[22] Filed: Oct. 26, 1992

[30] Foreign Application Priority Data

Oct. 29, 1991 [FR] France ................. 91 13315

[51] Int. Cl.⁵ .................. G02B 6/02; C03B 37/00
[52] U.S. Cl. .......................... 385/123; 385/11; 385/12; 385/125; 385/126; 65/2; 65/3.11; 65/11.1; 65/12
[58] Field of Search ............. 385/11, 123, 125, 126, 385/127, 128, 141, 142, 144, 14, 13, 12; 65/2, 3.1, 3.11, 3.4, 3.44, 12, 11.1; 250/227.11

[56] References Cited

U.S. PATENT DOCUMENTS

| | | |
|---|---|---|
| 4,354,736 | 10/1982 | Maklad et al. ............. 385/11 X |
| 4,603,943 | 8/1986 | Okoshi .................... 385/11 X |
| 4,630,889 | 12/1986 | Hicks, Jr. ............... 385/123 X |
| 4,634,218 | 1/1987 | Hicks, Jr. ................ 385/11 X |
| 4,681,399 | 7/1987 | Hicks, Jr. ................ 385/11 X |
| 4,730,886 | 3/1988 | Hicks ..................... 385/12 |
| 4,886,333 | 12/1989 | Hicks ..................... 385/12 |
| 4,926,040 | 5/1990 | Turpin et al. . |
| 4,928,005 | 5/1990 | Lefévre et al. . |
| 4,978,377 | 12/1990 | Brehm et al. ............. 65/3.11 |
| 4,995,697 | 2/1991 | Adamovsky ............... 385/12 |
| 5,000,540 | 3/1991 | Nakamura ............... 385/12 X |
| 5,062,153 | 10/1991 | Turpin et al. . |
| 5,064,270 | 11/1991 | Turpin et al. . |
| 5,111,525 | 5/1992 | Hartouni ................ 385/12 X |
| 5,132,941 | 7/1992 | Shackleton .............. 385/123 X |
| 5,259,059 | 11/1993 | Abramov ................. 385/123 |

FOREIGN PATENT DOCUMENTS

| | | | |
|---|---|---|---|
| 0147225 | 7/1985 | European Pat. Off. ........ 385/123 X |
| 0430781 | 6/1991 | European Pat. Off. ........ 65/3.11 X |
| 61-228404 | 10/1986 | Japan ...................... 385/11 X |
| 63-006507 | 1/1988 | Japan ..................... 385/123 X |
| 1-148723 | 6/1989 | Japan ..................... 385/123 X |
| 2-141436 | 5/1990 | Japan ..................... 385/123 X |
| 2215481 | 9/1989 | United Kingdom ............ 385/11 X |

Primary Examiner—Brian Healy
Attorney, Agent, or Firm—Oblon, Spivak, McClelland, Maier & Neustadt

[57] ABSTRACT

The invention is a hollow fiber with, over the full length of the fiber and between each fiber channel (3, 4) and the core, at least one stress zone (5, 6) to create an anisotropic stress distribution which subjects the fiber core to a tensile stress. The cable design is advantageous in that it is possible to control the sign of the fiber intrinsic birefringence. The cable is thus advantageous for use as a pressure sensor or pressure transducer.

16 Claims, 6 Drawing Sheets

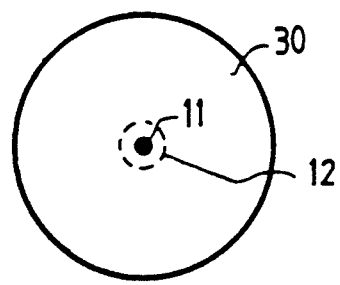
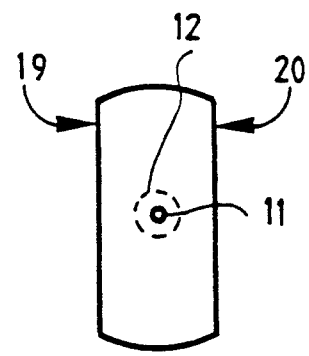
FIG. 5a  FIG. 5b
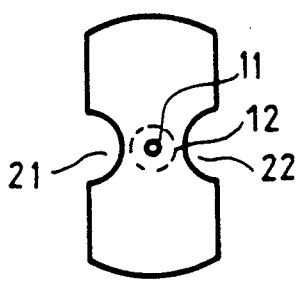
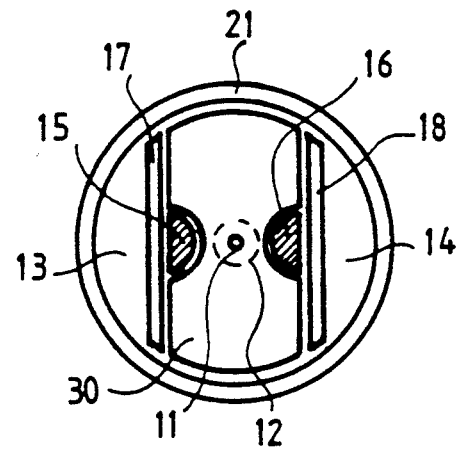
FIG. 5c  FIG. 5d
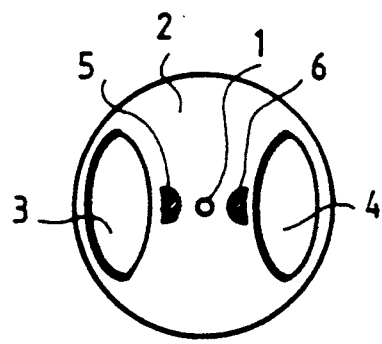
FIG. 6

OPTICAL FIBER SENSOR AND A MANUFACTURING PROCESS FOR MAKING SAME

BACKGROUND OF THE INVENTION

This invention is an optical fiber, particularly a birefringent optical fiber, and a process to manufacture it.

More specifically, the invention is an optical fiber containing internal channels which allows the sign of the fiber intrinsic birefringence to be controlled. The fiber makes it possible to optimize the conversion of stresses into a signal when the fiber is used as a pressure sensor.

DESCRIPTION OF THE PRIOR ART

Birefringent optical fibers which conserve polarization are used to propagate two mutually-perpendicular linear natural propagation modes. Depending on the application, one or both modes may be used. Two fundamental properties must then be considered:

the function of a transmission line transmitting a linearly polarized wave (possibly over a long range, up to several hundred meters). In this case, only one mode is excited;

the polarimetric function, in which the difference in propagation between the two modes is analyzed (for example for certain optical fiber sensors). Both natural modes are then excited.

If an optical fiber is made intrinsically birefringent by destroying its axial symmetry, distorting the core-cladding structure or by adding stress zones, it is important, for certain applications, such as for use as a sensor, to control the sign of the birefringence.

More precisely, a number of birefringent fibers are produced by distributing internal stresses dissymetrically. For example, the fiber may include lateral stress zones as shown in FIGS. 1a and 1b or may have a circular core and elliptical optical cladding (FIG. 1c). A highly dissymetric core, such as the elliptical core fiber shown in FIG. 1d, will also produce a birefringent fiber.

By definition of the term "birefringent", these optical fibers, which are monomode in terms of space, have two natural polarization modes (a slow axis and fast axis). The slow axis corresponds to the geometrical axis along which the optical core is subjected to tensile stresses (the axis is defined relative to a cross-section of the fiber).

A special birefringent optical fiber structure is obtained by creating two channels (holes) 3 and 4 on either side of the fiber core 1 (FIG. 2). The advantage of this type of fiber is its sensitivity to an external pressure (whether isotropic or anisotropic).

An isotropic external pressure creates an anisotropic stress distribution in the fiber core, thus creating a birefringent reaction due to the elasto-optical effect which is algebraically additive to the intrinsic birefringence of the fiber.

Depending on the structure of the fiber, the stress distribution due to the channels on either side of the core can subject the core to tensile stresses lying in a plane virtually through the centers of the channels.

FIG. 3a illustrates this case. The tensile stresses are F1 and F'1. An external pressure P on the fiber case creates forces Fp and Fp'. Pressure forces Fp and F'p create additional stresses in the same direction as the tensile stresses F1 and F'1 and, therefore, increases these tensile stresses (giving resultants R and R'). This increases the birefringent property as shown in FIG. 3c.

On the other hand, if the fiber is produced so that the channels produce a stress distribution which gives tensile stresses perpendicular to the plane virtually through the centers of the channel, the configuration becomes as shown in FIG. 3b. The effects of tensile stresses F1 and F'1 and pressure stresses Fp and Fp' then mutually oppose each other. When the pressure increases, the birefringence decreases, as shown in FIG. 3d.

Controlling the sign of the fiber intrinsic birefringence is therefore a major problem when the fiber is to be used as a pressure sensor and problems exist in manufacturing the fiber. To use the elastic properties of silica to form a transducer, measuring the widest possible range of pressures, it is preferable for the birefringence to increase with pressure, i.e. an increase in external pressure should lead to an increase in birefringence. Obviously, in the opposite case, the reduction of birefringence as the external pressure increases will tend to reduce the resultant birefringence to zero, thus limiting the potential measurement range and giving a nonlinear response when the birefringence is too low.

SUMMARY OF THE INVENTION

Consequently, the invention is a fiber in which the direction of birefringent variation is unaffected by manufacturing difficulties and in which birefringence increases as external pressure increases.

The invention is, therefore, an optical fiber with a guide core enclosed in guide cladding whose refractive index is lower close to the cladding core and which includes at least one cavity, running over the whole length of the fiber, close to the cladding core, and, over the full fiber length between the cavity and the fiber core, a stress zone which creates an anisotropic stress distribution and subjects the fiber core to a tensile stress.

In another embodiment, the stress zone is in a plane perpendicular to the plane through the fiber and channel centerlines and applies a compressive stress to the fiber core.

The invention is also a process to manufacture an optical fiber in which a blank, comprising guide cladding around a guide core, is produced and in which two grooves are machined, on either side of the core, in this blank; a strip, in a material different to the guide cladding material, is then laid in each slot; each strip is covered by a sheet of material identical to the cladding; a tube, in identical material to the cladding, is then placed round this assembly such that a space remains between each strip and the tube; the blank is then drawn.

The invention also includes other production processes.

BRIEF DESCRIPTION OF THE DRAWINGS

The invention will be better understood and other advantages will become clear on reading the following description and referring to the appended figures of which:

FIGS. 5a to 5d represent steps in the process of manufacturing an optical fiber complying with the invention;

FIG. 6 represents an optical fiber produced using this process;

DETAILED DESCRIPTION OF THE INVENTION

To control the sign of the intrinsic birefringence of the channelled fiber structure, in other words to control the relative orientation of the internal anisotropic stress distribution relative to a plane through the centerlines of the channels, the invention creates additional stress zones between the core and these channels. These stress zones are created by introducing, for example, strips of heavily-doped silica (as a non-exhaustive example, borosilicate) with a coefficient of thermal expansion considerably different from that of silica. During the fiber winding process, well known to industry, the blank structure, as it cools, leads to a highly anisotropic stress distribution. As they cool, the heavily-doped strips contract and create tensile stresses in the core.

Figure 1A:
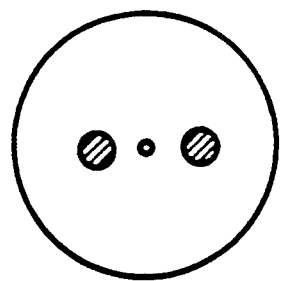
FIGS. 1a to 3d represent fibers known to the prior art.
Figure 1B:
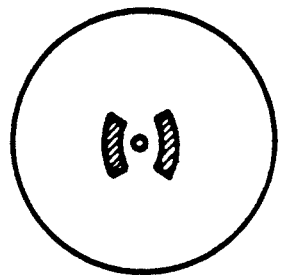
Figure 1C:
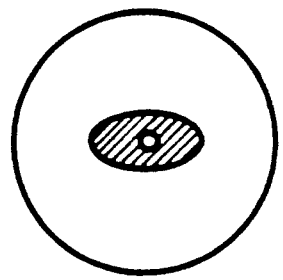
Figure 1D:
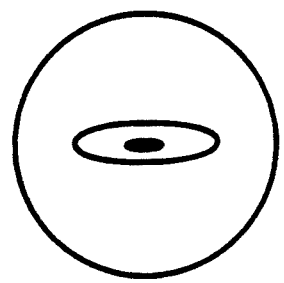
Figure 2:
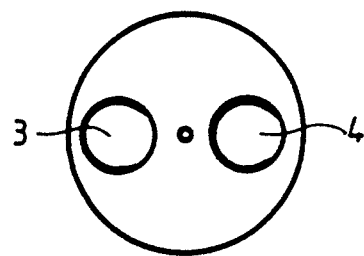
Figures 3A, 3B:
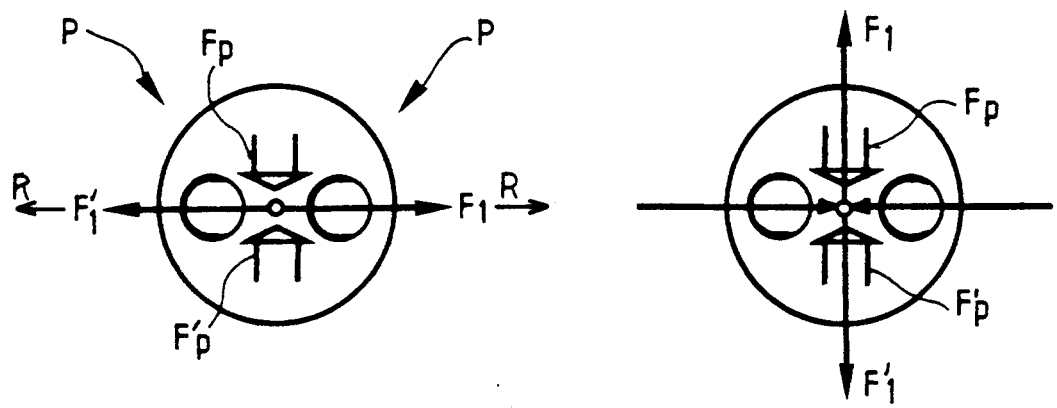
Figure 3C:
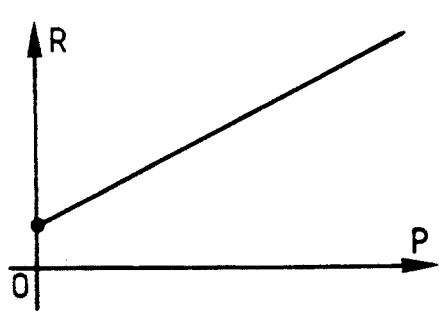
Figure 3D:
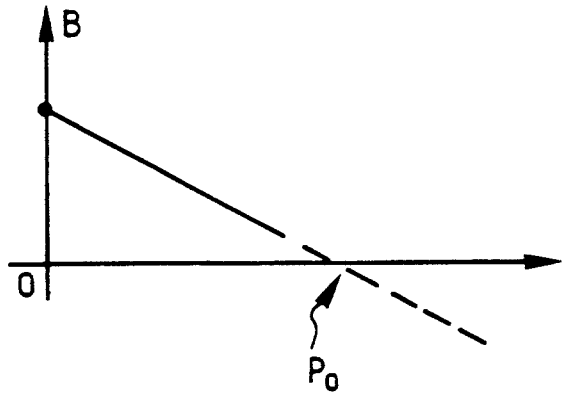
Figure 4A:
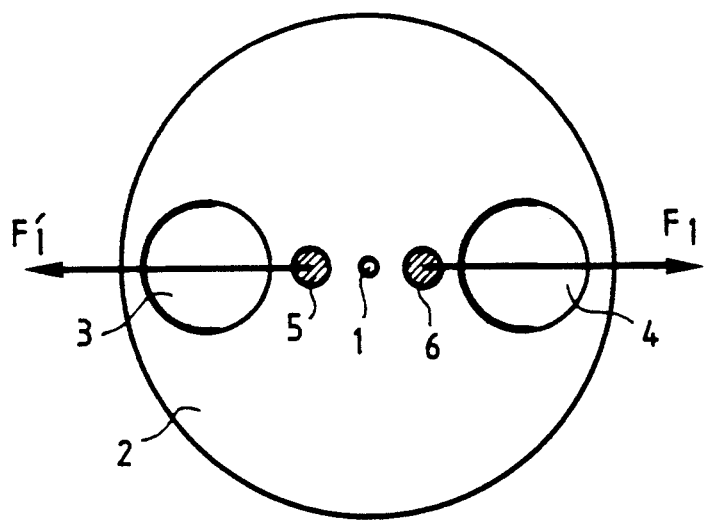
FIGS. 4a to 4c represent an optical fiber complying with the invention.
Figure 4B:
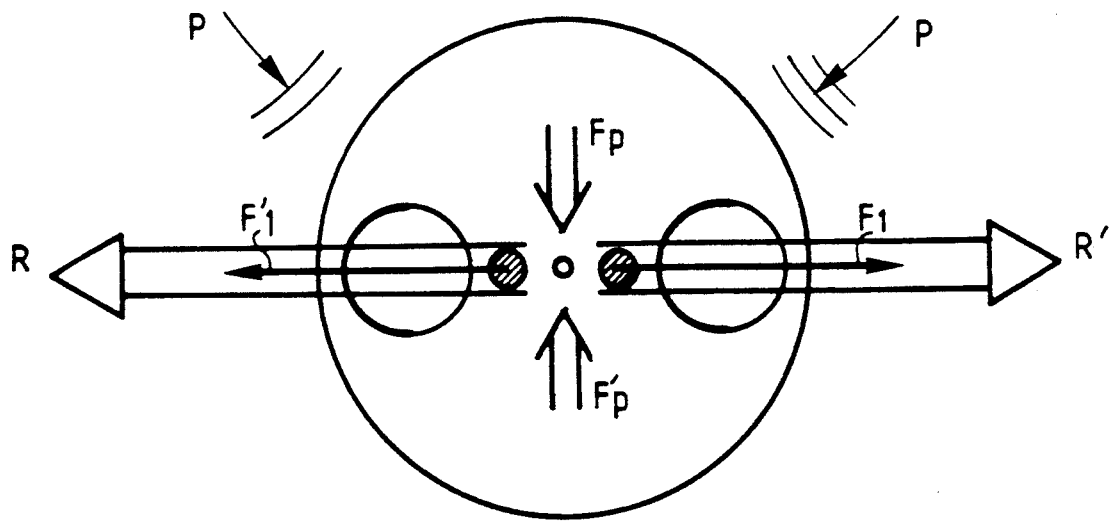

FIG. 4a represents just such a fiber comprising:
the fiber core 1;
channels 3 and 4 on either side of core 1;
stress zones 5 and 6 located between channels 3 and 4 and core 1 respectively.

Stress zones 5 and 6 create tensile stresses F1 and F'1 in a plane virtually through the centers of core 1, stress zones 5 and 6 and channels 3 and 4.

When a pressure P is applied to the fiber outer surface, it generates pressure forces Fp and F'p which compress the fiber in a plane perpendicular to the direction of tensile forces F1 and F'1. Force Fp and F'p therefore generate stresses in the same direction as tensile stresses F1 and F'1, giving resultant stresses R and R'.

These resultants therefore vary as a function of outside pressure P.

Figure 4C:
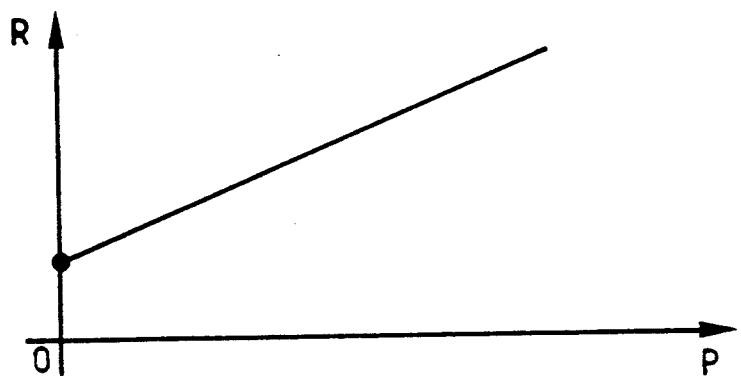

As shown in FIG. 4c, the tensile stresses, and therefore the birefringence, increase with pressure.

An optical fiber complying with the invention therefore has a guide core subjected to tensile stresses in the plane through the channel centerlines. Applying a pressure to the outside of the fiber generates compressive stresses in the core, perpendicular to the centerline between the channels, consequently tending to increase the intrinsic birefringence of the fiber.

We shall now describe a process to manufacture a fiber complying with the invention, referring to FIGS. 5a to 5d.

Firstly, a blank is produced as shown in FIG. 5a with a guide core 11 and guide cladding 12, produced from doped silica, trapped in a silica buffer 30. Such a blank can be produced, for example, using existing techniques in the form of a silica cylinder several tens of millimeters in diameter (20 to 25 mm for example) and several decimeters long.

The periphery of the blank is machined to produce two diametrically-opposed flats 19 and 20 (FIG. 5b). Two grooves 21 and 22 are then machined in these flats, parallel to the centerline of the blank and lying on a plane through the blank centerline (FIG. 5c).

Next two, for example doped silicon, strips 15 and 16 are placed in grooves 21 and 22 to act as stress-generating materials. The strips are of roughly the same shape as the grooves. Two plates 17 and 18 in the same material as the buffer 30 (silica) are placed on the flats. The assembly is then placed in a tube 21 of the same material as the buffer. FIG. 5d, representing the assembly obtained, shows that there remains a space between the plates 17, 18 and tube 21.

Finally, this assembly is drawn using a technique already know to optical fiber manufacturers. The process is adapted to control the fiber form. A preferred drawing method is described in French Patent Application No. 89 15872.

As an example, strips 15 and 16, used to create the stress zones, are in boron, aluminium or germanium-doped silica, etc.

In the foregoing, the sign of the birefringence is controlled by generating stress zones between the fiber core and the channels, to create tensile stresses in the fiber core.

Figure 7:
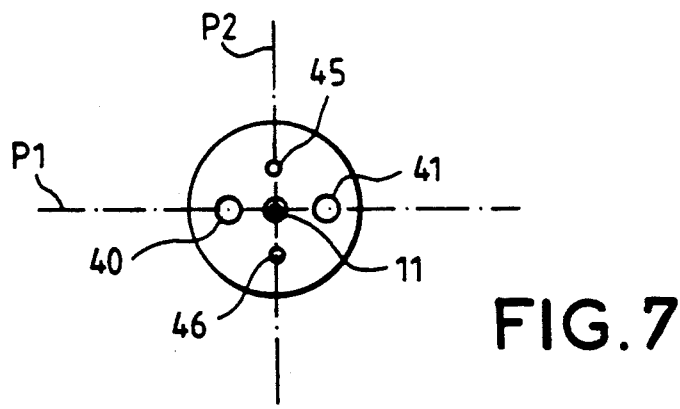
FIG. 7 represents a variant on an optical fiber complying with the invention.

As shown in FIG. 7, the invention is also a birefringent optical fiber with two cavities centered on a plane through the centerline of the fiber and positioned on either side of the core.

The fiber also includes, in axial plane P2 through the fiber center, perpendicular to the above plane, two stress zones (45, 46) lying on either side of the core and creating compressive stresses in the core.

These zones can, for example, be in titanium-doped silica or any other material with a lower thermal coefficient of expansion than pure silica.

We shall now describe the process to manufacture the fiber shown in FIG. 7, referring to FIGS. 8a to 8e.

Figure 8A:
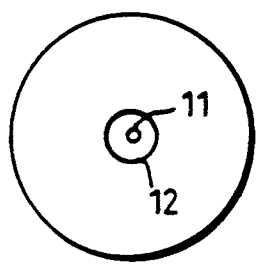
FIGS. 8a to 8e represent a process for manufacturing the optical fiber represented in FIG. 7.

A blank 30, with a core 11 and cladding 12, is produced (see FIG. 8a).

Figure 8B:
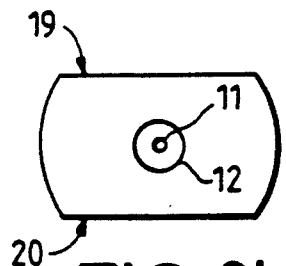
Figure 8C:
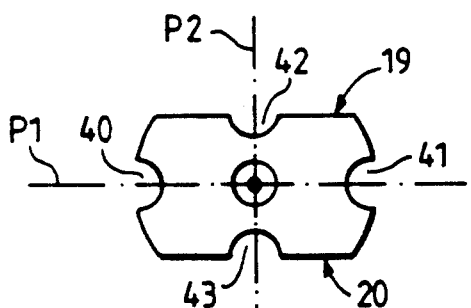
Figure 8D:
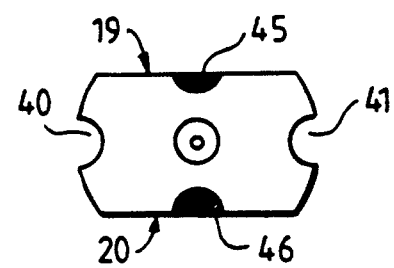
Figure 8E:
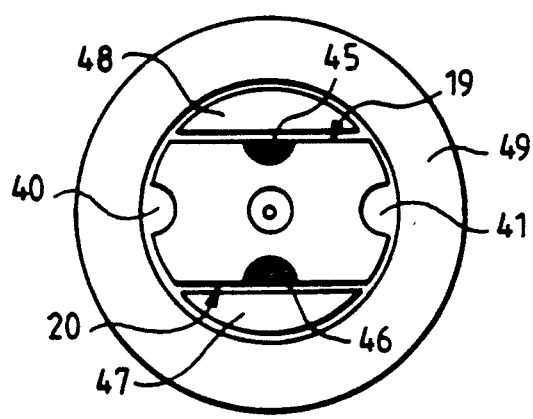

Two flats 19 and 20 are produced on the blank (FIG. 8b).

Grooves are then produced parallel to the blank centerline. Grooves 40 and 41 are produced in the remaining cylindrical surface of the blank. Grooves 42 and 43 are produced in flats 19 and 20. These grooves are symmetrically arranged about the blank centerline.

Strips 45 and 46 are placed in grooves 42 and 43 to act as stress-generating materials. The material for strips 45 and 46 is chosen so that, when the material cools after being heated for drawing (to be described later), it tends to expand.

For example, the material could be titanium-doped silica.

Parts 47 and 48, shaped as portions of a cylinder, are placed on either side of flats 19 and 20 to reconstitute the cylindrical form of the blank. The assembly is then placed in tube 49, in the same, or a similar, material to the buffer.

The blank thus produced is drawn using a technique known to industry. It thus produces a fiber with the cross-section shown on FIG. 7.

Figure 9:
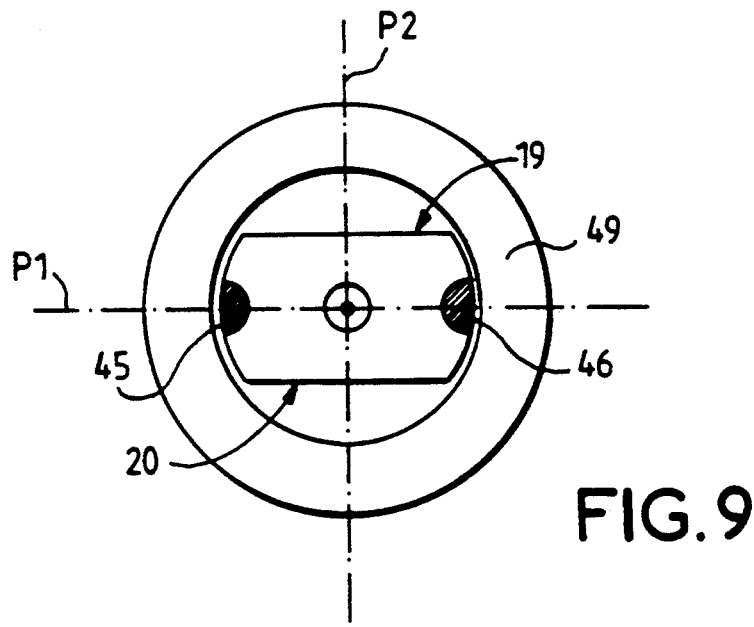
FIGS. 9 and 10 represent variants on the process illustrated by FIGS. 8a to 8e.

FIG. 9 shows a variant of the invented process in which there are no grooves 42 and 43 and strips 45 and 46 are placed in grooves 40 and 41. They are no parts 47 and 48 on either side of flats 19 and 20. The assembly is placed in tube 49 and the spaces left free between the flats and tube 49 serve as channels in the fiber.

Figure 10:
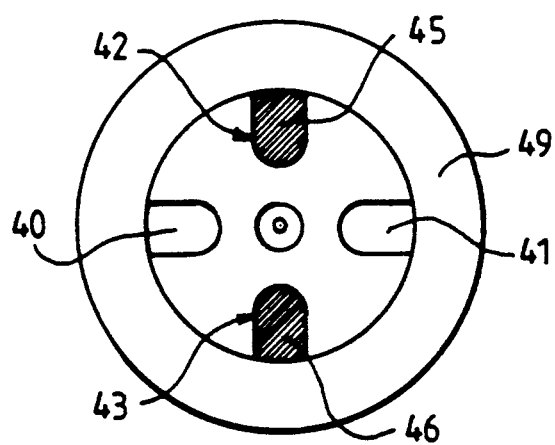

FIG. 10 illustrates another variant of the process invented in which there are no flats 19 and 20. Grooves 40, 41, 42 and 43 are produced in the circumference of the cylindrical blank. Strips 45 and 46 are placed in grooves 42 and 43. The assembly is then placed in tube 49 and the drawing operation is applied.

Obviously, the above description is only an example. Other variants are also possible within the scope of the invention. In particular, the examples of materials used or the shapes of the various components shown in the figures are intended solely to illustrate the description.

What is claimed is:

1. A sensor formed of an optical fiber comprising a guide core enclosed in guide cladding with a refractive index which is lower in the core of the cladding and which includes, close to the core, at least one cavity, running the full length of the fiber, and which also includes, over the full length of the fiber, between said at least one cavity and the fiber core, a stress zone which creates an anisotropic stress distribution and generates a tensile stress in the fiber core, and wherein said stress zone is disposed in said guide cladding.

2. A sensor formed of an optical fiber comprising a guide core in guide cladding with a lower refractive index at the core of the cladding and including, close to the core and over the full fiber length, at least one cavity lying on a first plane of symmetry through the fiber centerline, in which there is also, over the full length of the fiber and in a second plane of symmetry, perpendicular to the first plane, at least one stress zone creating an anisotropic stress distribution and generating a compressive stress in the fiber core, and wherein said at least one stress zone is disposed in said guide cladding such that said at least one stress zone and said at least one cavity are separated by said guide cladding.

3. A sensor as described in either of claims 1 or 2, in which the stress zone is in a material whose thermal coefficient of expansion is different to that of the guide cladding material.

4. A sensor as described in claim 3 in which the stress zone is in a material whose thermal coefficient of expansion is higher than that of the guide cladding material.

5. A sensor as described in claim 1 or 2, in which the fiber includes two cavities located on either side of the core and a stress zone located between each cavity and the core.

6. A sensor as described in claim 1 or 2, in which the cladding is in silica and the stress zones are in heavily-doped silica.

7. A sensor as described in claim 2, in which there are two cavities placed symmetrically about the fiber centerline and two stress zones also placed symmetrically about the fiber centerline.

8. A process to manufacture an optical fiber in which a blank, comprising guide cladding surrounding guide core and enclosed in a buffer, is manufactured first and in which two grooves, located on either side of the core, are machined in the blank; strips of material different to the guide cladding are then placed in each groove and each strip is covered by a plate in identical material to the buffer, the assembly is placed in a tube in material similar to that of the buffer so that an empty space exists between each plate and the tube; this blank is then drawn.

9. A process to manufacture an optical fiber as described in claim 8, in which the buffer is in silica and the strips are in heavily-doped silica.

10. A process to manufacture an optical fiber as described in claim 8, in which the machining of slots includes machining two flats on the blank, on either of the core and then machining two grooves diametrically opposed about the core, in the flats.

11. A process to manufacture an optical fiber as described in claim 10, in which each plate has the same dimensions as the flats.

12. A process to manufacture an optical fiber in which a blank, comprising guide cladding surrounding a guide core and enclosed in a buffer is manufactured first and in which two longitudinal grooves, located on a first plane of symmetry through the fiber centerline and symmetrical about the fiber axis of symmetry, are machined together with two grooves located on a second plane of symmetry, perpendicular to the first plane and symmetrical about the fiber axis of symmetry; the two grooves are then filled with a stress material after which the assembly is placed in a tube and, finally, drawn.

13. A process to manufacture an optical fiber as described in claim 12, in which, before machining the second grooves, flats are machined and the second grooves are then machined in them, these grooves then being filled with a stress material after which parts, designed to reconstitute the cylindrical form of the blank, are placed against the flats.

14. The sensor of claim 1, wherein said optical fiber includes a pair of cavities which are diametrically opposed to one another with said core disposed between said pair of cavities, and wherein a stress zone is provided between each of said pair of cavities and the fiber core.

15. The sensor of claim 2, wherein a pair of cavities are provided lying on said first plane of symmetry, and wherein a pair of said stress zones are provided in said second plane of symmetry.

16. The sensor of claim 1 or claim 2, wherein said sensor is a pressure sensor.

* * * * *